Feb. 16, 1926.
M. F. BATES
STABILIZED BOMB SIGHT
Filed Sept. 30, 1921  2 Sheets-Sheet 1
1,573,028
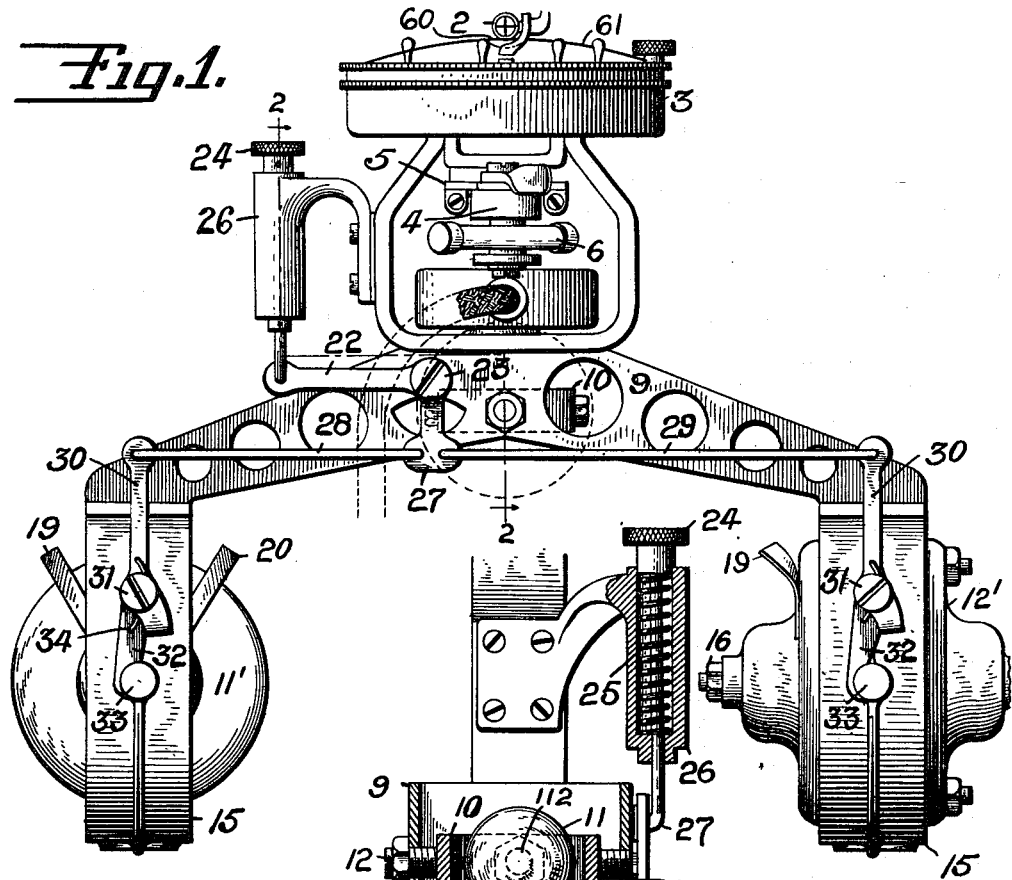
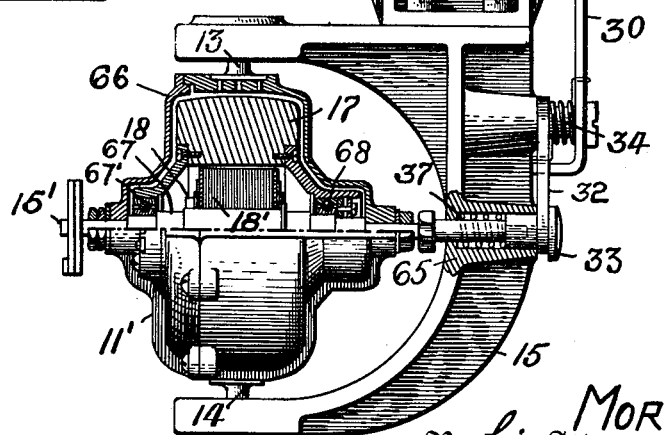
Inventor
MORTIMER F BATES
By his Attorney
Herbert H. Thompson Feb. 16, 1926.
M. F. BATES
STABILIZED BOMB SIGHT
Filed Sept. 30, 1921    2 Sheets-Sheet 2
1,573,028
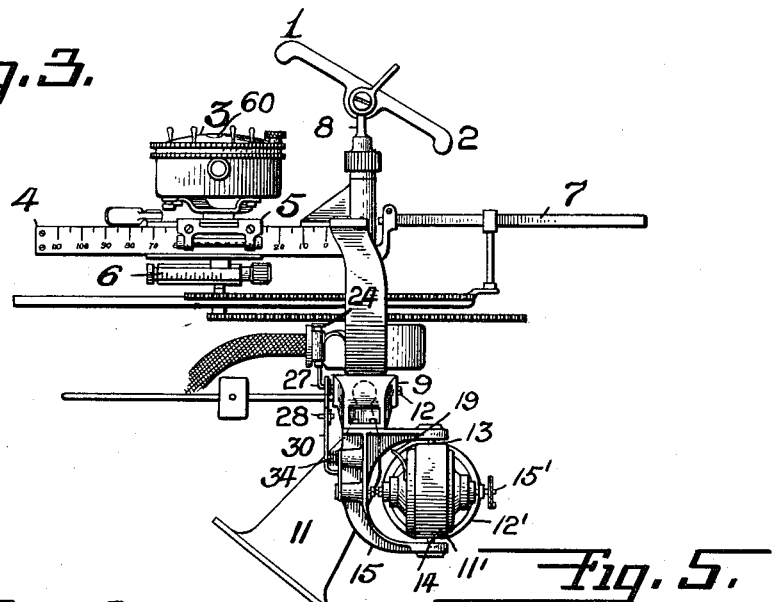
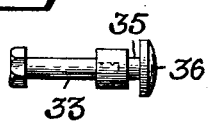
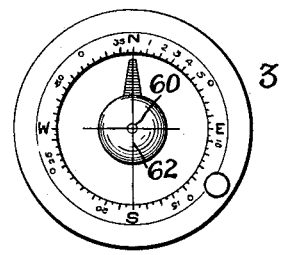
Inventor
MORTIMER F BATES
By his Attorney
Herbert H. Thompson Patented Feb. 16, 1926.

1,573,028

UNITED STATES PATENT OFFICE.

MORTIMER F. BATES, OF BROOKLYN, NEW YORK, ASSIGNOR TO THE SPERRY GYROSCOPE COMPANY.

STABILIZED BOMB SIGHT.

Application filed September 30, 1921. Serial No. 504,470.

*To all whom it may concern:*

Be it known that I, MORTIMER F. BATES, a citizen of the United States of America, residing at 1544 48th Street, Brooklyn, in the county of Kings and State of New York, have invented certain new and useful Improvements in Stabilized Bomb Sights, of which the following is a specification.

This invention relates to bomb sights for airplanes. In all types of bomb sighting apparatus yet developed, it is necessary that a base line be established while taking the observation. Said base line is preferably horizontal and is in most types of existing instruments, established by the pilot himself, by consulting a liquid level or levels, but it is found that even though a level is found, it is impossible to maintain a device by hand exactly level in two planes, and at the same time take careful observations while the airplane is changing its position and consequently, disturbing the base line. The principal object of my invention is to provide a stabilizing means for bomb sights, which will maintain a given base line for a sufficient period to enable observations to be taken, and which at the same time will not add materially to the bulk of the observing apparatus, nor to its complication.

I am aware that many attempts have been made to stabilize instruments of this character on airplanes by gyroscopes, but so far as I am aware, all of said attempts have been based upon the idea of establishing an unchangeable horizontal base line, by means of a gyroscope under the influence of gravity, or in other words, a pendulous gyroscope, without assistance from the observer. While a pendulous gyroscope if left to itself, will indicate and maintain the horizontal, it is subject to all of the acceleration pressures on the airplane and consequently in practice, the pendulous gyroscope is in a constant state of slow oscillation and is therefore, seldom horizontal. Moreover, if the gyroscope alone is to be depended upon, it must be made of sufficient size to stabilize the sight for long periods. According to my invention however, I make no attempt to establish a horizontal base line by means of a gyroscope, but employ the gyroscopes merely to maintain for a period sufficient to take an observation, a base line set by the pilot. The gyroscopes are preferably entirely free from the effect of gravity and hence are also free from acceleration pressures.

Referring to drawings in which what I now consider to be the preferred form of my invention is shown;

Figure 1 is a front elevation of the bomb sight with my stabilizing attachment affixed thereto, Figure 2 is a sectional view of the same, taken approximately on line 2—2 of Fig. 1, a gyro casing also being shown in section.

Figure 3 is a side view on a smaller scale of the apparatus.

Figure 4 is a detail of the locking bolt.

Figure 5 is a top view of a compass.

I wish it understood that my invention is independent of the particular form of bomb sight employed. I have illustrated a well known form of bomb sight comprising sights 1 and 2, compass 3, air-speed bar 4, compass slide 5, wind bar 6, ground speed bar 7, and altitude bar 8.

The whole device is supported universally by means of the frame 9 and gimbal ring 10 on post 11 the gimbal ring being supported on a pin 112 passing through said post and said ring in turn pivotally supports frame 9 on studs 12, 12. For leveling the device by hand, I may make use of the air bubble 60 that is usually present in compasses filled with liquids, such as shown in the drawing. For this purpose, the compass crystal 61 is slightly convex and may be provided with a central cross 62, so that the level in both planes may be indicated.

The gyroscopic portion of the apparatus is shown as comprising preferably a plurality of gyroscopes 11' and 12'. each supported for precession about its vertical axis 13, 14 in its frame 15 secured to frame 9. The two gyroscopes preferably have their spinning axes at an angle to one another, as shown. The spinning axis 15' of gyro 11' is fore and aft, while the spinning axis 16 of gyro 12' is athwartships. The gyroscopes are preferably spun electrically, the rotors 17 thereof being formed as the part of induction motors 18 as shown in Fig. 2. The frame or casing 66 supports the stator 18' on the stationary shaft 67 on which the rotor is journalled at 67' and 68 and completely encloses the rotor. Being supported on vertical axes, the gyroscopes are comparatively unaffected by gravity, unless a centralizing means is provided between them and the frame. Heretofore, it has been the practice to provide such means, such as a spring connecting the gyroscope and frame about its precession axis, so that the whole system became in fact, a gyro pendulum. I prefer, however, to employ no resilient connection whatever between the gyro and frame. Also, the system is substantially balanced or only slightly pendulous about pin 112 and axis 12. I do however, provide limit stops 19 and 20 on each gyroscope, which are adapted to strike the frame 15 when the gyroscope precesses more than the predetermined amount.

I also provide means for locking the gyroscopes to the frame, except when it is desired to release the same. For this purpose, I have provided a bell-crank lever 22, pivoted to the frame 9 at 23. One end of said lever is connected to a thumb piece 24, which is normally held up by spring 25, within housing 26 secured to the frame. The other end 27 of said lever is connected through links 28 and 29 to pivoted trips 30 on each gyro frame 15. Each of said trips is pivoted to said frame on a post 31, the lower end thereof bearing against spring pressed catch 32. Said catch is also pivoted on pin 31 and is normally pressed into engagement with the locking pin or bolt 33 by means of spring coil 34. Said catch takes in a circular recess 35 behind the head 36 of pin 33 (see Fig. 4) and hence holds said pin in the locking position as shown in Figure 2, against the action of the compression spring 37 seated in the recessed boss 65 in frame 15. Said pin at its inner end bears against some point on the gyro casing 66, thus locking the gyroscope to the frame and preventing precession. As soon as the catch however is released from said recess, the spring 37 snaps the pin outwardly and releases the gyroscope. It will be readily apparent that both gyroscopes are released simultaneously by the pressing down of the thumb piece 24. The gyroscopes may be reset and locked by any convenient means. As shown, the operator turns by hand each gyroscope into the proper position and locks each gyroscope in place by pressing each pin 33 inwardly and latching catch 32 behind head 33 on each pin separately.

The operation of my improvement as applied to bomb sights is as follows: The gyroscopes are normally maintained locked, so that the whole frame behaves as if no gyroscopes were present and the operator may adjust it in any desired position. When he is about to take a reading, the pilot is of course instructed to fly as horizontally as possible. The observer then sets the bomb sight by means of the bubble in the compass, so that it is horizontal. When he is all ready to take a reading, the observer presses button 24, releasing both gyroscopes simultaneously, as explained. The gyroscopes then act to maintain the level set by the observer for a sufficient period to enable observations to be taken, or in other words, until the manœuvres of the airplane have caused the stops of either gyroscope to strike the frame, or caused an appreciable oscillation to be set up. When the observation is completed, each gyroscope is reset by hand, or otherwise, as explained and the apparatus is in condition for a second observation. By applicant's invention the observer is thus left free to make his observation without the necessity of trying to keep the device level by one hand as is the present practice and adjust sights with the other, since the gyroscopes will maintain a level once set better than the observer, and at the same time leave the observer free to concentrate on the sighting operation.

In accordance with the patent statutes, I have herein described the principle of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a bomb sight, of stabilizing means therefor comprising a pair of gyroscopes, a universally supported frame for supporting the gyroscopes and sight, separate means for locking each gyroscope and a common means for simultaneously unlocking the same.

2. The combination with a bomb sight, of stabilizing means therefor comprising a pair of gyroscopes having their spinning axes at an angle to one another, a universally supported frame for supporting the gyroscopes and sight, means for locking each gyroscope and means for simultaneously unlocking the same.

3. As a stabilizing means for bomb sights and the like for aeroplanes, the combination with a bomb sight, of a frame secured to the sight, means for universally supporting the same, a plurality of gyroscopes freely supported in said frame with their precessional axes at an angle to each other, means for locking each gyroscope and means for unlocking the same at will.

4. As a stabilizing means for bomb sights and the like for aeroplanes, the combination with a bomb sight, of a frame secured to the sight, means for universally supporting the same, a plurality of gyroscopes freely supported in said frame with their precessional axes at an angle to each other, means for separately locking each gyroscope and means for simultaneously unlocking the same at will.

5. As a stabilizing means for bomb sights and the like for aeroplanes, the combination with a frame secured to the sight, means for universally supporting the same, a gyroscope freely supported on said frame for precession with respect thereto and uninfluenced by gravity, and a stop for said gyroscope to prevent precession beyond a predetermined amount.

6. In combination, a substantially non-pendulous system comprising a universally-mounted frame, a sight carried by said frame, means for opposing forces tending to disturb the frame, and means for limiting the degree within which said first-named means is effective.

7. In combination, a slightly pendulous system comprising a universally mounted frame, a sight carried by said frame, a plurality of gyroscopes freely mounted in said frame for opposing forces tending to disturb the frame, said gyros precessing in response to said disturbing forces and means for limiting the precession of said gyroscopes.

8. In combination, a slightly pendulous system comprising a universally mounted frame, a sight carried by said frame, a plurality of gyroscopes freely mounted in said frame for opposing forces tending to disturb the frame, said gyros precessing in response to said disturbing forces, and means for limiting the degree within which said gyroscopes are effective in opposing said disturbing forces.

In testimony whereof I have affixed my signature.

MORTIMER F. BATES.